United States Patent
Choudhury et al.

(10) Patent No.: US 10,346,025 B2
(45) Date of Patent: Jul. 9, 2019

(54) FRICTION FIELD FOR FLUID MARGIN PANNING IN A WEBPAGE

(71) Applicant: Microsoft Technology Licensing, LLC, Redmond, WA (US)

(72) Inventors: Arnab Choudhury, Kirkland, WA (US); Raman Sarin, Kirkland, WA (US); Brian Ostergren, Redmond, WA (US); Bo Rohlfsen, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 620 days.

(21) Appl. No.: 13/759,839

(22) Filed: Feb. 5, 2013

(65) Prior Publication Data
US 2014/0223280 A1   Aug. 7, 2014

(51) Int. Cl.
*G06F 17/00* (2019.01)
*G06F 3/0487* (2013.01)
(Continued)

(52) U.S. Cl.
CPC ........ *G06F 3/0487* (2013.01); *A63F 13/2145* (2014.09); *A63F 13/426* (2014.09); *G06F 3/0485* (2013.01); *G06F 3/04812* (2013.01)

(58) Field of Classification Search
CPC .... G06F 17/2247; G06F 17/24; G06F 17/211; G06F 3/0481; G06F 3/048; G06F 3/016;
(Continued)

(56) References Cited

U.S. PATENT DOCUMENTS 5,963,191 A * 10/1999 Jaaskelainen, Jr. ... G06F 3/0481
                                                                        715/856
6,147,674 A    11/2000 Rosenberg et al.
(Continued)

FOREIGN PATENT DOCUMENTS

JP         2004271439 A    9/2004
WO    WO 2006020304 A2 *  2/2006    ............. G06F 3/048

OTHER PUBLICATIONS

"Qt Kinetic Scrolling—from Idea to Implementation", Published on: Jan. 16, 2011, Available at: http://www.developer.nokia.com/Community/Wiki/Qt_Kinetic_scrolling_-_from_idea_to_implementation.
(Continued)

*Primary Examiner* — Jason T Edwards
(74) *Attorney, Agent, or Firm* — Alleman Hall Creasman & Tuttle LLP

(57) ABSTRACT

A cursor in a viewable portion of a webpage, or pan region, visually encounters a friction field when the cursor enters a margin of the viewable portion. As a user moves the cursor into the margin of the viewable portion, the movement of the displayed position of the cursor is limited as if the cursor is being restricted by a friction field in the margin. Also, as the cursor enters the margin of the viewable portion of the webpage, the webpage scrolls in the opposite direction of movement of the cursor. The amount of scroll of the webpage is proportional to a distance the cursor is away from an inner edge of the margin. When a user no longer attempts to move the cursor in the margin, the cursor fluidly drifts back toward a center of the viewable portion and so that scrolling of the webpage pauses.

14 Claims, 9 Drawing Sheets

(51) Int. Cl.
*G06F 3/0485* (2013.01)
*G06F 3/0481* (2013.01)
*A63F 13/426* (2014.01)
*A63F 13/2145* (2014.01)

(58) Field of Classification Search
CPC ...... G06F 3/0354; G06F 3/033; G06F 3/0487; G06F 3/04812; G06F 3/0485; G06F 2203/014; G06F 3/03543; G06F 3/03548; A63F 13/2145; A63F 13/426
USPC ........ 715/234, 786, 787, 762, 856, 862, 977
See application file for complete search history.

(56) References Cited

U.S. PATENT DOCUMENTS

| | | | |
|---|---|---|---|
| 6,161,126 A * | 12/2000 | Wies | G05B 19/00 709/203 |
| 6,252,579 B1 * | 6/2001 | Rosenberg et al. | 715/856 |
| 6,292,174 B1 | 9/2001 | Mallett et al. | |
| 6,677,965 B1 * | 1/2004 | Ullmann | G06F 3/04812 715/786 |
| 6,954,899 B1 | 10/2005 | Anderson | |
| 7,131,073 B2 | 10/2006 | Rosenberg et al. | |
| 7,519,920 B2 | 4/2009 | Jarrett et al. | |
| 2003/0043174 A1 * | 3/2003 | Hinckley et al. | 345/684 |
| 2003/0169280 A1 | 9/2003 | Hsieh | |
| 2003/0201973 A1 * | 10/2003 | Gould | G06F 3/04812 345/156 |
| 2005/0057509 A1 * | 3/2005 | Mallett | G06F 3/016 345/163 |
| 2007/0097150 A1 | 5/2007 | Ivashin et al. | |
| 2008/0168364 A1 * | 7/2008 | Miller | G06F 3/016 715/762 |
| 2009/0015557 A1 * | 1/2009 | Koski | G06F 3/016 345/163 |
| 2010/0070912 A1 * | 3/2010 | Zaman | G06F 3/0481 715/784 |
| 2010/0261526 A1 * | 10/2010 | Anderson | G06F 3/017 463/31 |
| 2012/0266109 A1 * | 10/2012 | Lim et al. | 715/863 |
| 2012/0278762 A1 * | 11/2012 | Mouilleseaux | G06F 3/0482 715/834 |

OTHER PUBLICATIONS

Zainab, "Scrollbar Anywhere: Click & Drag Anywhere to Scroll a Webpage [Chrome]", Published on: Feb. 14, 2012, Available at: http://www.addictivetips.com/internet-tips/scrollbar-anywhere-click-drag-anywhere-to-scroll-a-webpage-chrome/.

Barber, Sacha, "Creating a Scrollable Control Surface in WPF", Published on: Apr. 10, 2008, Available at: http://sachabarbs.wordpress.com/2008/04/10/creating-a-scrollable-control-surface-in-wpf/.

Asque, et al., "Haptic-Assisted Target Acquisition in a Visual Point-and-Click Task for Computer Users with Motion Impairments", In Proceedings of IEEE Transactions on Haptics, vol. 5, Issue 2, Sep. 25, 2011, 11 pages.

"Curs_outopts(3x) OS X Developer Tools Manual Page", Retrieved on: Oct. 15, 2012, Available at: http://developer.apple.com/library/Mac/#documentation/Darwin/Reference/ManPages/man3/curs_outopts.3x.html.

"International Search Report & Written Opinion for PCT Application No. PCT/US2014/014743", dated Apr. 29, 2014, Filed Date: Feb. 4, 2014, 10 Pages.

* cited by examiner

FRICTION FIELD FOR FLUID MARGIN PANNING IN A WEBPAGE

BACKGROUND

A webpage (or web page) is a document or information resource that is suitable for the World Wide Web (or Internet) and can be accessed through a web browser and viewed on a display or mobile device. This information is usually in Hypertext Markup Language (HTML) or Hypertext Markup Language Extensible (XHTML) format, and may provide navigation to other webpages via hypertext links. Webpages frequently subsume other resources such as style sheets, scripts and images into their final presentation.

A variety of input devices may be used to view a webpage. For example, a mouse may have a scroll wheel that allows a user to scroll through a webpage by moving the scroll wheel. A browser may have a scroll bar on a right side of a rendered webpage that allows a user to scroll the webpage by a user moving the cursor over the scroll bar and pressing on the left button of the mouse while dragging the mouse forward or backward. On a device that has a touch sensitive display surface, such as a cellular telephone, a user may scroll a webpage by flicking a finger up or down, or from side to side, while the webpage is viewable on the touch sensitive display surface.

SUMMARY

A cursor in a viewable portion of a webpage, or pan region, visually encounters a friction field when the cursor enters a margin of the viewable portion. As a user moves the cursor into the margin of the viewable portion, the movement of the displayed position of the cursor is limited as if the cursor is being restricted by a friction field in the margin. Also, as the cursor enters the margin of the viewable portion of the webpage, the webpage scrolls or pans in the opposite direction of movement of the cursor. The amount of scroll of the webpage is proportional to a distance the cursor is away from an inner edge of the margin. When a user no longer attempts to move the cursor in the margin, the cursor fluidly drifts back toward a center of the viewable portion so that scrolling of the webpage pauses. For example when a cursor is in the margin causing a webpage to scroll, a user may release a thumb stick of a controller that controls the cursor so that the cursor fluidly drifts back toward the center of the viewable portion.

The user's experience feels very intuitive. The application of vector physics to position a cursor and scroll a webpage while in the margin of the viewable portion renders a level of realism to the experience that is delightful to an end user.

A method to view a webpage embodiment includes determining a position of a cursor. A friction value is calculated corresponding to the position of the cursor when the position of the cursor is in a margin of a viewable portion of the webpage. A value that indicates an amount of scroll to provide to the webpage in response to the friction value is outputted. A value that indicates where to position the cursor in the margin in response to the friction value is also outputted.

An apparatus embodiment includes at least one processor readable memory to store a browser having processor readable instructions to position a webpage in a viewport. At least one processor executes the processor readable instructions of the browser to receive a value that indicates an intended position of the cursor and determine a position of the cursor. A friction value is calculated for the cursor when the position of the cursor is in a margin of the viewport. A friction value is calculated for the scroll when the position of the cursor is the margin of the viewport. The cursor is positioned in the viewport in response to the value that indicates an intended position of the cursor and the friction value for the cursor. The webpage in the viewport is rendered such that the webpage is scrolled in proportion with the value that indicates the amount of scroll of the webpage.

In another embodiment, at least one processor readable memory having processor readable instructions encoded thereon is executed by the at least one processor to perform a method to view a webpage. The method includes receiving a value that indicates an intended position of a cursor on a viewable portion of the webpage. A value that indicates an intended scroll of the viewable portion of the webpage is also received. A cursor value is updated to an updated cursor value used to position the cursor on the viewable portion of the webpage when the intended position of the cursor is in the margin of the viewable portion. The updated cursor value indicates positioning the cursor at a distance farther away from an outer edge of the viewable portion than the intended position of the cursor. Similarly, a scroll command is updated to an updated scroll command and used to scroll the webpage when the intended position of the cursor is in the margin. The updated scroll command is proportional to a distance between the position of the cursor and an inner edge of the margin.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

An end user is provided with the ability to fluidly scroll a webpage with visual frictional feedback when a cursor is moved to a margin of viewable portion of a webpage (pan region or viewport). As the cursor enters the margin of the viewable portion of the webpage, the webpage scrolls or pans in the opposite direction of movement of the cursor. The amount of scroll of the webpage is proportional to a distance the cursor is away from an inner edge of the margin. The movement of the cursor is limited when in the margin of the viewable portion of the webpage as if the cursor is encountering a friction field. When a user no longer attempts to move the cursor in the margin of the viewable portion of the webpage, the cursor fluidly drifts back toward a center of the viewable portion. Margin panning with frictional feedback may be implemented by applying vector physics concepts to apply a number of forces onto the cursor. In alternate embodiments, other methods that don't rely on vector physics concepts may be used to provide margin panning with frictional feedback. In an embodiment, the end result of the vector force calculation is used to update a cursor position in the margin of the viewable portion of the webpage and a scroll amount of the webpage at the end of a frame in a video game update loop.

In an embodiment, the viewable friction field does not affect an amount of scrolling provided to a web page, the friction field controls how much the cursor is pushed against by a webpage as the webpage moves underneath the cursor. For example, imagine that a cursor is a puck sliding in the opposite direction that a moving walkway is moving. When they move against each other in opposite and equal speed it will appear to the outside observer that the puck is not moving. The friction field is what keeps the cursor from moving further down the page (to the edge of the screen) unless the cursor has more speed (i.e. the thumb stick is pressed further). The friction field also moves the cursor back up with the page when the thumb stick is released (just like when the puck stops moving against the walkway, the puck will move with the walkway instead). At the point the cursor is pushed outside the margin the panning will cease.

Figure 1:
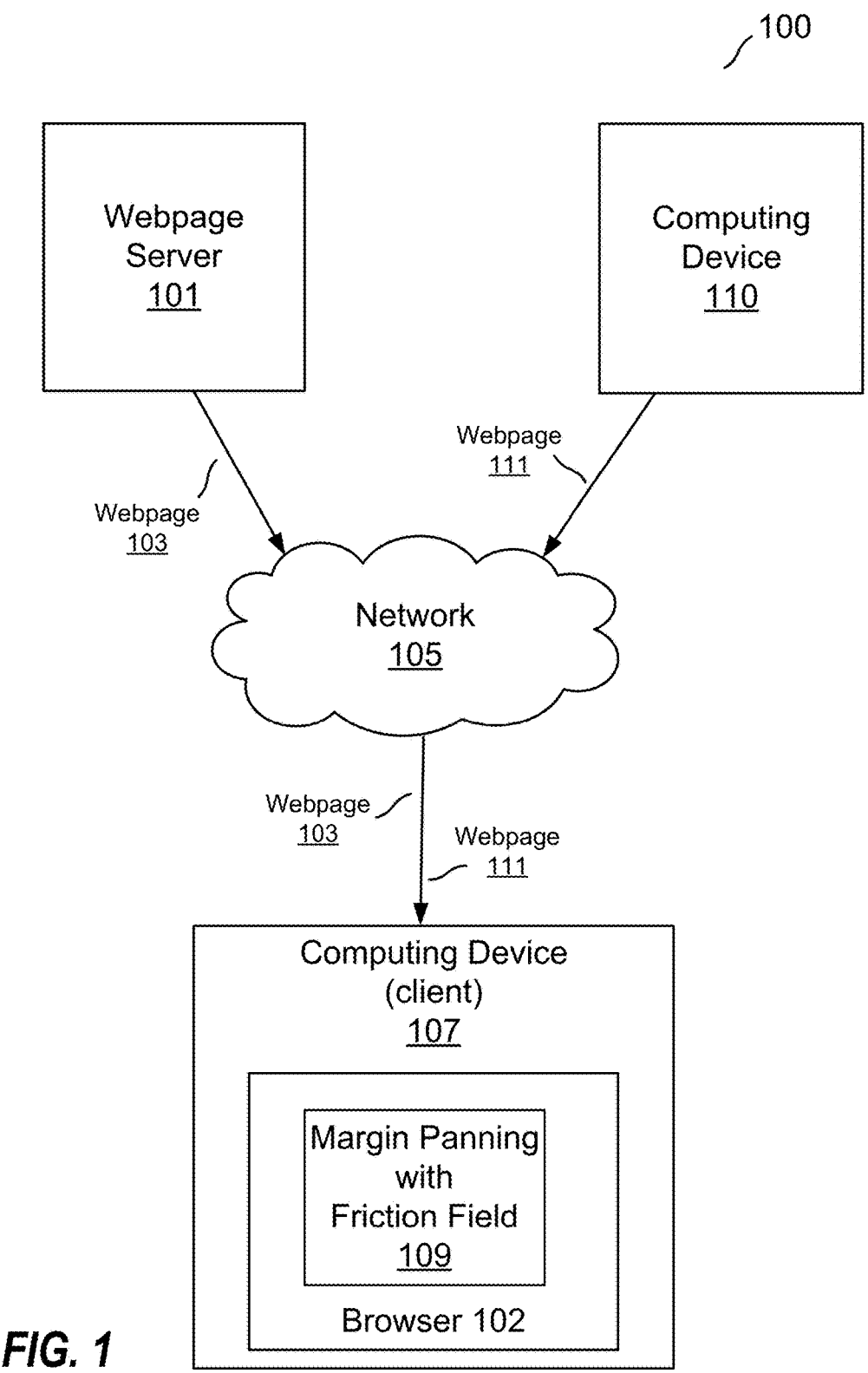
FIG. 1 is a high-level block diagram of an apparatus providing webpages to a computing device having margin panning with a friction field to view a webpage.

FIG. 1 is a high-level block diagram of an apparatus 100 providing webpages 103 and 111 to a computing device 107 via network 105. In an embodiment, computing device 107 has a browser 102 including margin panning with friction field 109 that pans a webpage and positions a cursor in a viewable portion of webpages 103 and 111.

Figure 7:
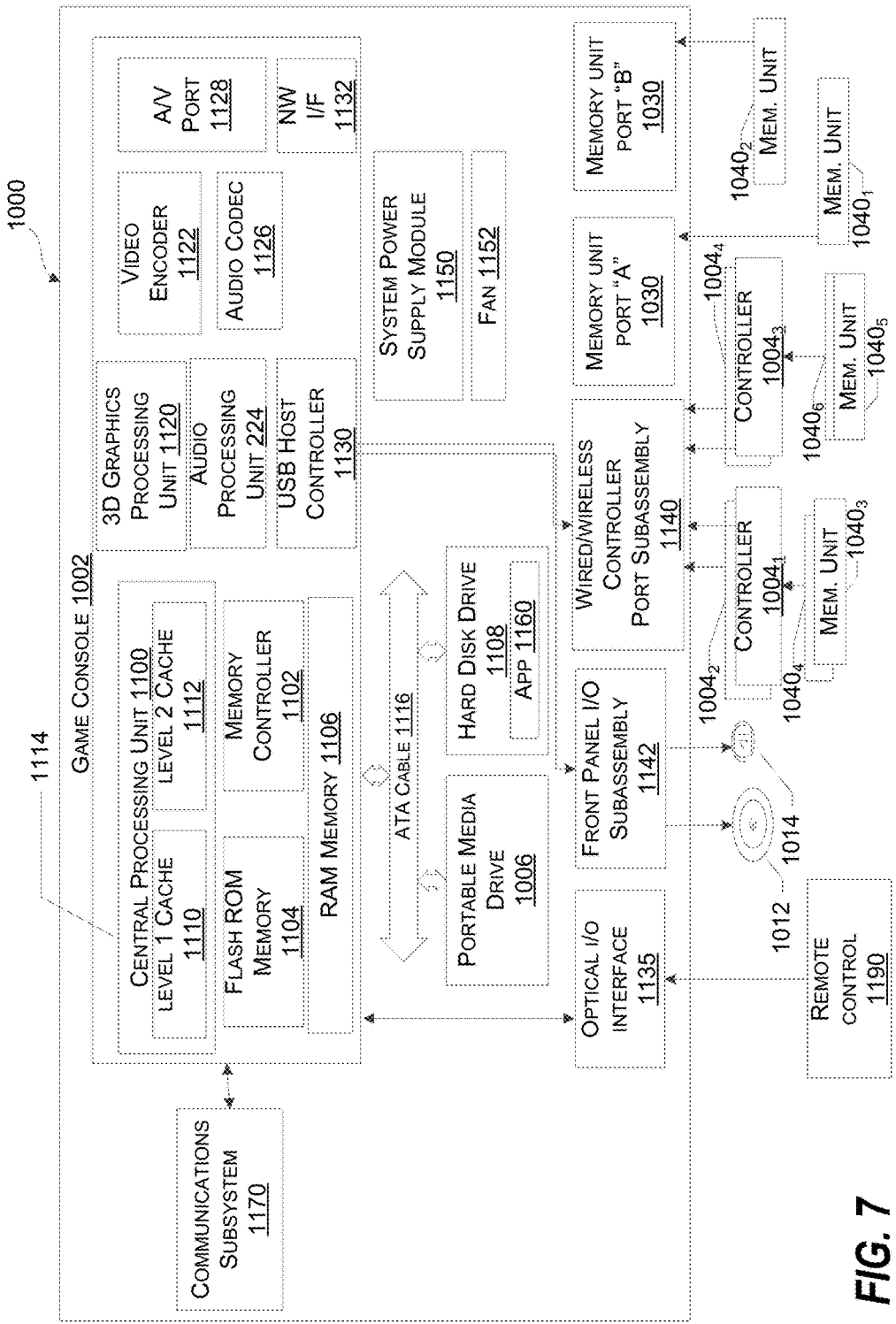
FIG. 7 is an exemplary functional block diagram of components of the gaming and media system.
Figure 8:
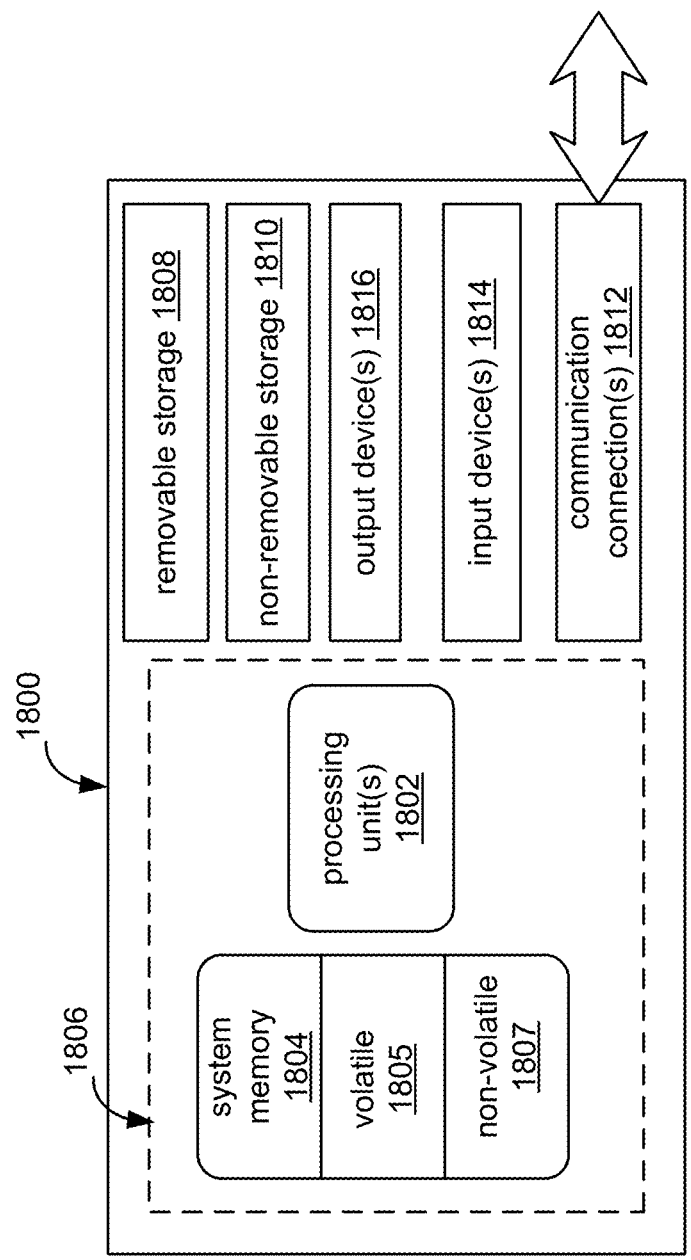
FIG. 8 illustrates is a block diagram of one embodiment of a network accessible computing device.

In an embodiment, computing device 107 is included in a video game console and/or media console having a controller with a thumb stick as described herein and illustrated in FIGS. 7 and 8. In alternate embodiments, computing device 107 may be included in at least a cell phone, mobile device, embedded system, media console, laptop computer, desktop computer, server and/or datacenter.

In an embodiment, webpage server 101 provides webpage 103 to computing device 107 that may be a client of web server 101.

Similarly, computing device 110 provides webpage 111, to computing device 107. In an embodiment, computing devices 110 and 107 are peers and transfer the webpage 111 as such in an embodiment. In a peer-to-peer (P2P) embodiment of computing devices 107 and 110, each computing device may act as a client or a server of the other.

Webpages 103 and 111 are documents or information resources that are suitable for the World Wide Web (also known as the Internet) and can be accessed through a web browser 102 and viewed on a display or mobile device. This information is usually in HTML or XHTML format, and may provide navigation to other webpages via hypertext links. Webpages frequently subsume other resources such as style sheets, scripts and images into their final presentation. When webpages are stored in a common directory of a web server, they become a website in an embodiment.

In alternate embodiments, other types of information are viewed that is not necessarily on a webpage. For example, song lists, programming guides as well as other similar types of information may be viewed with margin panning with frictional feedback in alternate embodiments.

Web pages 111 and 103 may be retrieved from a remote computer, local computer or from a remote web server. Web server 101 may restrict access only to a private network, e.g. a corporate intranet, or it may publish pages on the World Wide Web. In an embodiment, webpages 111 and 103 are requested and served from webpage server 101 and computing device 110 using Hypertext Transfer Protocol (HTTP).

Webpages may consist of files of static text and other content stored within the web server's or computing device file system (static webpages), or may be constructed by server-side software when they are requested (dynamic webpages). Client-side scripting can make webpages more responsive to user input once on a browser 102.

A web browser 102, in an embodiment, is an application designed to enable users access, retrieve and view information resources on the World Wide Web. An information resource is identified by a Uniform Resource Identifier (URI) in an embodiment and may be a webpage, image, video, document or other piece of content. Hyperlinks present in resources enable users easily to navigate their browsers to related resources.

Although browsers are primarily intended to use the World Wide Web, browsers can also be used to access information provided by web servers in private networks or files in file systems. In embodiments, browser 102 may be selected from Chrome, Firefox, Internet Explorer, Opera, and Safari browsers.

In alternate embodiments, apparatus 100 includes many more or less computing devices and/or servers to provide and receive webpages. In embodiments, web server 101, computing device 110 and/or computing device 107 corresponds to computing device 1800 having particular hardware components illustrated in FIG. 8 and as described herein.

In an embodiment, network 105 may be the Internet, a Wide Area Network (WAN) or a Local Area Network (LAN), singly or in combination. In embodiments, computing device 107 is included in another network. Webpages 103 and 111 may be transferred by wire and/or wirelessly in network 105.

Webpages will often require more screen space than is available for a particular display resolution. A browser may have a scrollbar (a sliding tool at the side of the screen that allows the user to move the page up or down, or side-to-side) in the window to allow the user to see all content of the webpage. Also computer keyboards may have page up and down keys to view the webpage, and computer mice may have vertical scroll wheels to view a webpage.

In an embodiment, browser 102 provides a viewable portion of the webpage as a viewport. In an embodiment, browser 102 provides a visible scroll bar.

Figure 2:
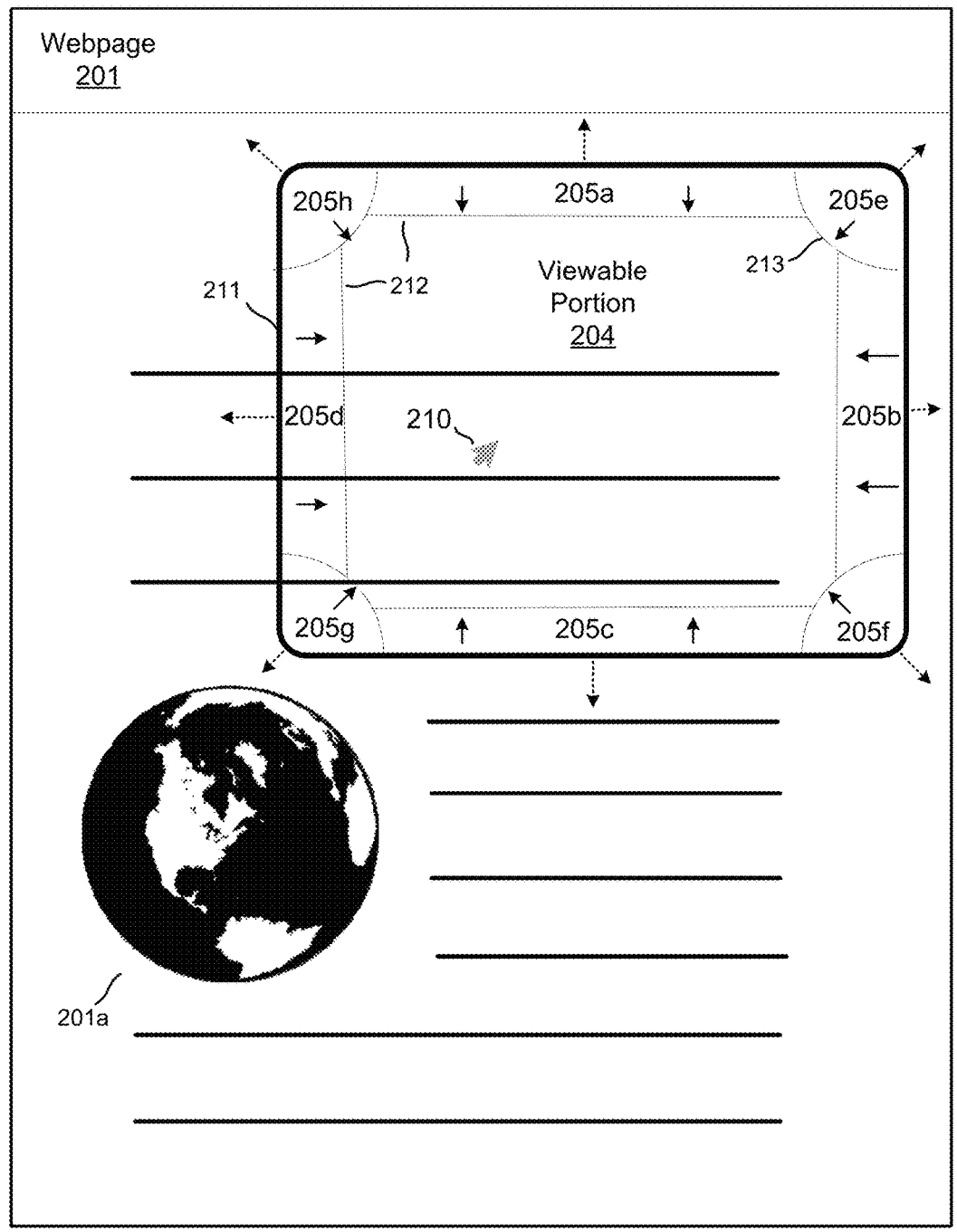
FIG. 2 illustrates a pan region or viewable portion of a webpage having margin panning with a friction field represented by arrows.

FIG. 2 illustrates a pan region or viewable portion 204 of a webpage 201 having a margin friction field represented by solid arrows. A user is able to view different portions of webpage 201 (as illustrated by dashed arrows) by moving cursor 210 into a margin 205. Margin 205 of viewable portion 204 includes margin portions 205a-h defined by inner edge 212 (that includes the arc inner edge 213 at respective corners) and outer edge 211. Webpage 201 scrolls or pans in response to a cursor 210 being positioned into margin 205. In an embodiment, webpage 201 scrolls or pans in the opposite direction of movement of cursor 210 in margin 205. For example, webpage 201 scrolls up to view the right half of the earth image 210a when cursor 210 is positioned in image portion 205c. In embodiments, scrolling or panning is not limited to horizontal and/or vertical scrolling. In embodiments, webpage 201 may scroll diagonally. For example, webpage 201 may scroll diagonally to view all of earth image 210a when cursor 210 is in margin portion 205g.

In an embodiment, a user positions cursor 210 by moving a thumb stick on a controller of a console as described herein. When the cursor 210 enters the margin 205, cursor 210 reacts or is positioned on a display as if the cursor entered a friction field as represented by the solid arrows. In particular, when cursor 210 is in the margin 205 of viewable portion 204, cursor 210 acts as if there are two vector forces acting on the cursor.

The first vector force that is acting on cursor 210 is represented by the analog input being supplied by the user via a thumb stick of a controller. The two dimensional analog displacement of a thumb stick from the default zero position is translated into two dimensional cursor velocities on a display. When cursor 210 is in margin 205, the vector displacement of cursor 210 from the inner edge 212 of the margin 205 (normalized over a predetermined number of pixels) is translated into a scroll command that is provided to a webpage renderer.

The second vector force that is acting on cursor 210 is a friction force applied in margin 205. When cursor 210 is in margin 205, a frictional force is applied that is directly proportional to the rate of the scroll being experienced by webpage 201 (due to cursor 210 being in margin 205). The direction of this frictional force opposes the direction of cursor 210.

When cursor 210 is not in margin 205 of viewable portion 204, cursor 210 is positioned on the display as if only the first vector force is applied and the user does not visually encounter any resistance when moving cursor 210. When cursor 210 is moved into margin 205, because of the second force, the user immediately starts to visually encountering resistance from cursor 210. As soon as a user releases the thumb stick of a controller, there is now only the second vector force acting on cursor 210. As a result, cursor 210 begins to fluidly drift back out of margin 205 in the opposite direction of scroll. The end effect is that a user feels like cursor 210 is "sticking" to webpage 201 as cursor 210 fluidly drifts back out of margin 205 to a center of viewable portion 204. The user's experience feels very intuitive. The use of vector physics concepts to position cursor 210 and scroll webpage 201 with respect to viewable portion 204 renders a level of realism to experience that is delightful to an end user.

In an embodiment, webpage 201 scrolls with respect to viewable portion 204 using the following computations. When cursor 210 is in margin portions 205a-d, the rate of scroll of webpage 201 with respect to viewable portion 204 is equal to the vertical or horizontal distance of cursor 210 from an inner edge 212 of margin 205 normalized over a predetermined number of pixels (e.g. 100 pixels).

In an embodiment, the scrolling of a webpage 201 with respect to the viewable portion 204 is related to the rate at which a user presses on a thumb stick of a controller.

When cursor 210 is in margin portions 205e-h, the rate of scroll of webpage 201 with respect to the viewable portion 204 is equal to a distance of cursor 210 from an arc inner edge 213 of margin 205, such as arc inner edge 213. In another embodiment, the rate of scroll is equal to a distance from the point at which the line joining the center of the viewable portion 204 (origin 0, 0 shown in FIG. 3) with a corner nearest to cursor 210 intersects an arc at the corner (as formed by distance $m_c$ in FIG. 3). The distance from the arc inner edge is normalized over a predetermined number of pixels in an embodiment.

In an embodiment, a cursor 210 is positioned as if the cursor experiences a friction field in margin 205. In particular, a cursor 210 is positioned on a display as if a friction value was applied when cursor 210 is in margin 205. For example, a friction field value for positioning the cursor equals the above scroll rate divided by a predetermined amount, such as 0.75. The friction value is then negated and used in updating a position of cursor 210 in margin 205. In an embodiment, when cursor 210 is in a vertical margin (such as margin portions 205a and 205c) or in a horizontal margin (such as margin portion 205b and 205d), cursor 210 is positioned with respect to a vertical or horizontal frictional field value. When cursor 210 is in the diagonal panning regions (such as margin regions 205e-h), cursor 210 experiences a two dimensional frictional field value.

In an embodiment, in order for a user to access fringe edges of webpage 201, a damping coefficient or value is used in the friction field that linearly increases from zero to 1 over a pixel offset from the edges of webpage 201. A user notices a gradual decrease in the friction field or friction value that causes a positioning of cursor 210 as the user navigates to an edge of webpage 201. When a user reaches an edge of webpage 201, cursor 210 does not appear to experience friction and a user can easily move cursor 210 in the margin 205.

Figure 3:
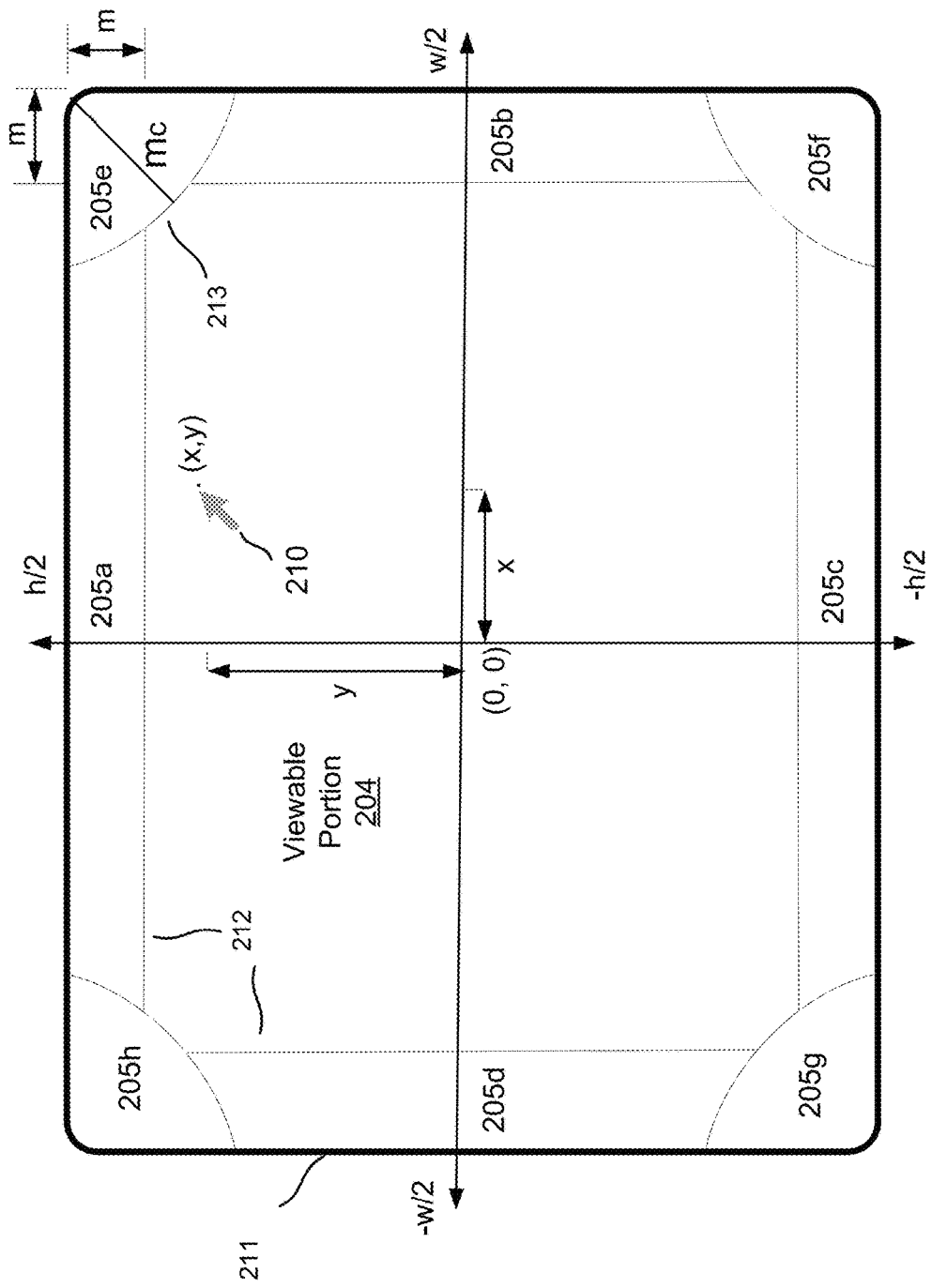
FIG. 3 illustrates coordinates for calculating an amount of scroll a webpage has when a cursor is in a margin of a viewable portion of the webpage and a position of a cursor when the cursor is in a margin of a viewable portion of a webpage.

FIG. 3 illustrates coordinates for calculating a position a cursor 210 in a margin 205 of a viewable portion 204 and scrolling a webpage 201 at a scroll rate (or amount of scroll) dependent upon the position of cursor 210 in margin 205. For example, viewable portion 204 has a height of h and a width of w in an embodiment. Cursor 210 is positioned at coordinates (x, y) with an origin (0,0) at the center of viewable portion 204. A margin 205 of viewable portion 204 includes margin portions 205a-d and 205e-h. Horizontal and vertical margin portions 205a-d are defined by distance m from the outer edge 211 to inner edge 212 of viewable portion 204. Diagonal margin portions 205e-f are defined by a radius $M_c$ that forms a portion of a disk having a center at respective corners of viewable portion 204. In alternate embodiments, other shapes of margins may be used for viewable portion 204.

In an embodiment, a determination as to whether a position of cursor 210 is in margin 205 may be performed by using equations 1 or 2.

Equation 1 is used to determine whether a cursor is in horizontal or vertical margin portions 205a-d:

$$abs(x) >= (w/2 - m) \text{ or } abs(y) > (h/2 - m). \quad \text{(Equation 1)}.$$

Equation 2 is used to determine whether a cursor is in diagonal margin portions 205e-h using an Euclidean distance computation:

$$d_c = \text{sqrt}((h/2 - abs(y))2 + (w/2 - abs(x))2) \text{ where } d_c \text{ is a distance a cursor is from a respective corner of viewable portion 204} \quad \text{(Equation 2)}.$$

When $d_c < m_c$, a cursor is in diagonal portions 205e-h.

When a determination is made that cursor 210 is in margin 205, a friction value representing a friction field magnitude and direction is computed and normalized. The friction value is ultimately used to position the cursor 210 in margin 205 as if the cursor 210 was visually encountering a friction field in margin 205. Similarly, the friction value is used to determine the amount of scroll webpage 201 will have when cursor 210 is in margin 205. In an embodiment, friction values are normalized between 0 and 1.0 (Friction value$_{normalized}$) in an embodiment. These normalized friction values are used as a negative offset in positioning cursor 210 in margin 205 as well as used in a scroll command to control an amount of scroll (or scroll rate) of webpage 201 with respect to viewable portion 204 when cursor 210 is in margin 205.

In an embodiment, when cursor 210 is in a horizontal margin portions 205b and 205d, a friction value$_{normalized}$ is calculated by equation 3 below:

$$\text{Friction value}_{normalized} = (w/2 - abs(x))/m \qquad \text{(Equation 3)}.$$

In an embodiment, when cursor 210 is in a vertical margin portion 205a and 205c, a friction value$_{normalized}$ is calculated by equation 4 below:

$$\text{Friction value}_{normalized} = (h/2 - abs(y))/m. \qquad \text{(Equation 4)}.$$

In an embodiment, when cursor 210 is in diagonal margin portions 205e-h a friction value$_{normalized}$ is calculated by equation 5 below:

$$\text{Friction value}_{normalized} = (m_c - d_c)/m_c \qquad \text{(Equation 5)}$$

In embodiments, Friction value$_{normalized}$ is a value between 0 and 1.0 and is calculated using floating point computations to avoid data loss.

In an embodiment, a scroll rate value, such as a scroll value, indicates the amount of scroll a webpage 201 scrolls with respect to viewable portion 204. In an embodiment, the scroll value is output with a scroll command to a webpage renderer to scroll a webpage 201. In an embodiment, the scroll value is proportional to the amount of scroll a webpage 201 experiences. In an embodiment, a scroll value is obtained by multiplying a user configured or inputted scroll sensitivity value s by a Friction value$_{normalized}$ as calculated by equation 6 below:

$$\text{Scroll value} = \text{Friction value}_{normalized} * s \qquad \text{(Equation 6)}.$$

In order to obtain a current cursor position in a friction field of margin 205, the scroll value is subtracted from an intended cursor position as input by a user to obtain the current cursor value used to display a cursor in a viewable portion of webpage.

In embodiments, a scroll value and friction value may be calculated by margin panning with friction field 109 using one or more software components. In an embodiment, a software component may include processor/machine readable instructions when executed by one or more processors perform one or more functions. In an embodiment, a software component may include a software program, software object, software function, software subroutine, software method, software instance, script or a code fragment, singly or in combination. In an embodiment, an application or application software program may include one or more software components. In an embodiment, an application uses the services of a computing device's operating system and/or other supporting applications.

In alternate embodiments, margin panning with friction field 109 may be implemented in a hardware device, integrated circuits and/or logic.

Figure 4:
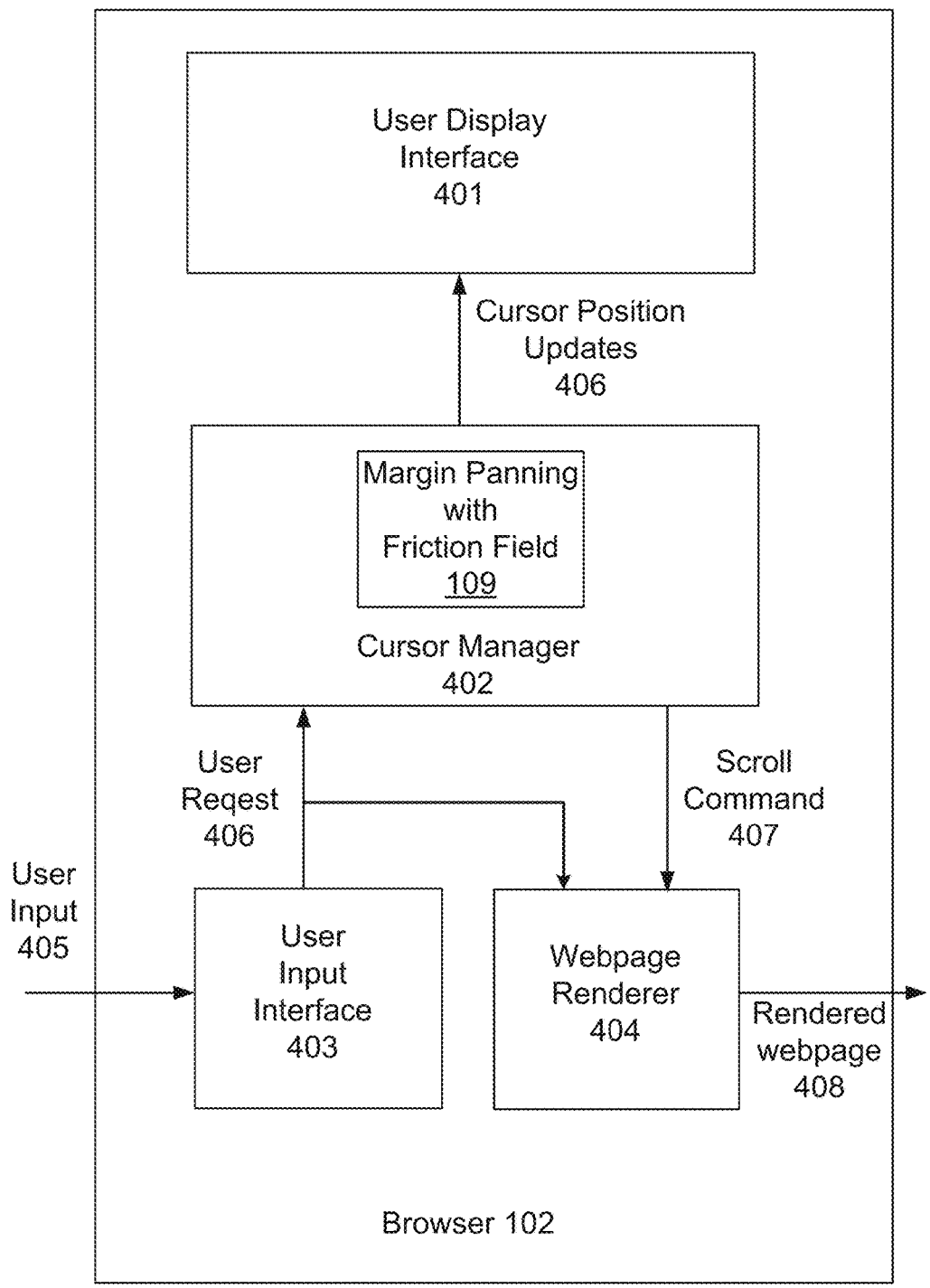
FIG. 4 illustrates a software architecture of browser having margin panning with a friction field.

FIG. 4 illustrates a software architecture using margin panning with friction field 109 in a browser 102 embodiment. In embodiments, margin panning with friction field 109 and browser 102 (along with other components illustrated) are software components. In alternate embodiments, margin panning with friction field 109 is not used with browser 102.

User input 405 is received by user input interface 403. In an embodiment, user input 405 may be a digital value that corresponds to a movement and/or position of a thumb stick on a controller.

User input interface 403 outputs a user request 406 to cursor manager 402 and webpage renderer 404. Webpage renderer 404 outputs a rendered webpage 408 to user display interface 401 in response to user request 406 and scroll command 407 in an embodiment. In an embodiment, a user request 406 may include a requested position of a cursor and requested amount of scroll of a webpage with respect to a viewable portion as indicated by the movement of a thumb stick on a controller.

Cursor manager 402 includes margin panning with friction field 109 that calculates an amount of scroll of a webpage based on a position of the cursor in the margin of the viewable portion. Also, margin panning with friction field 109 calculates a cursor position to be displayed as if the cursor was experiencing a friction field when the cursor enters a margin of the viewable portion. Margin and panning with friction field 109 outputs a cursor position update to user display 401 to take into account the friction field effect of the cursor in the margin of the viewable portion. Similarly, margin and panning with friction field 109 outputs a scroll command 407 having a scroll rate value based on the position of the cursor in the margin of a viewable portion of a webpage.

User display interface 401 is responsible for displaying a cursor on a display in response to cursor position updates 406 from margin panning with friction field 109.

Webpage renderer 403 is responsible for scrolling a webpage with respect to a viewable portion in response to a scroll command 407. In an embodiment, a scroll command 407 includes an associated scroll rate value that indicates a rate or amount of scrolling of the webpage based on the position of a cursor in the margin of a viewable position.

Figure 5A:
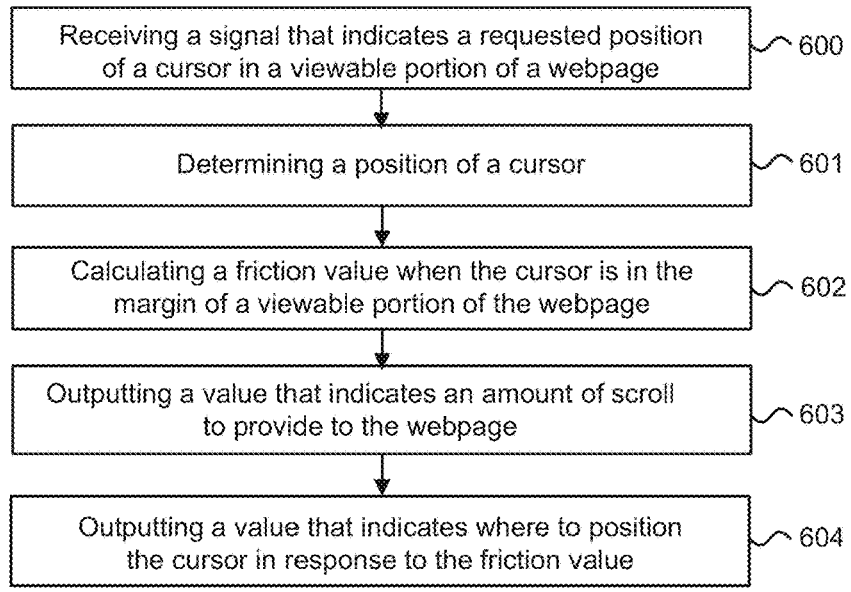
FIGS. 5A-C are flow charts for providing margin panning with a friction field.
Figure 5B:
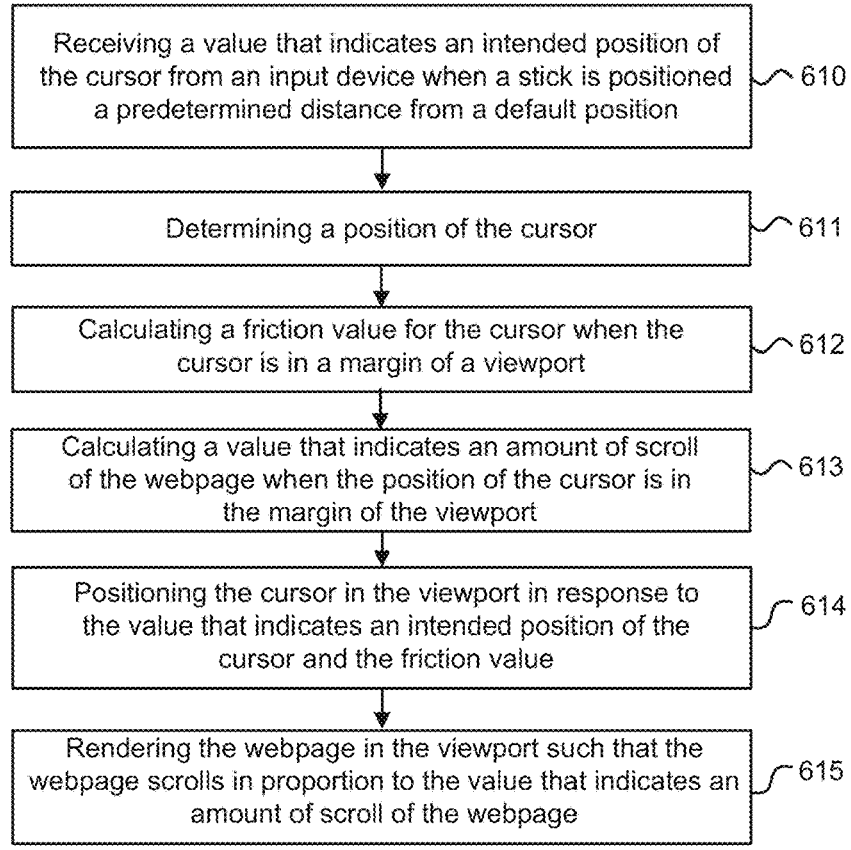
Figure 5C:
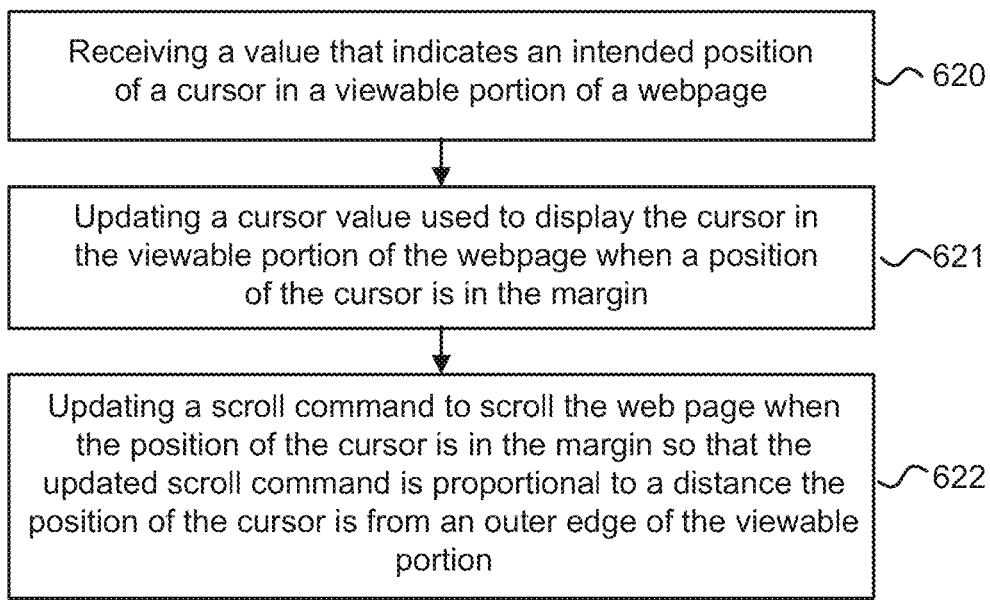

FIGS. 5A-C are flow charts for providing margin panning with s friction field to a webpage in various embodiments. In embodiments, steps illustrated in FIGS. 5A-C represent the operation of hardware (e.g., processors, memories, circuits), software (e.g., operating systems, browsers, software components, applications, engines, drivers, machine/processor executable instructions), or a user, singly or in combinations. As one of ordinary skill in the art would understand, embodiments may include less or more steps shown. In various embodiments, steps illustrated may be completed sequentially, in parallel or in a different order as illustrated.

In an embodiment, at least one software component performs the steps of FIG. 5A. For example, step 600 illustrates receiving a signal that indicates a requested position of a cursor in a viewable portion of a webpage.

Step 601 represents determining a position of the cursor.

Step 602 represents calculating a friction value when the cursor is in a margin of a viewable portion of the webpage.

Step 603 represents outputting a value that indicates an amount of scroll to provide to the webpage and step 604 illustrates outputting a value that indicates where to position the cursor in response to the friction value.

In an embodiment, a browser executed by at least one processor in a console that provides video games performs the steps of FIG. 5B. For example, step 610 represents receiving a value that indicates an intended position of the cursor from an input device when a stick is positioned a predetermined distance from a default position.

Step 611 illustrates determining a position of the cursor.

Step 612 illustrates calculating a friction value for the cursor when the cursor is in a margin of a viewport.

Step 613 illustrates calculating a value that indicates an amount of scroll of the webpage when the position of the cursor is in the margin of the viewport.

Step 614 illustrates positioning the cursor in the viewport in response to the value that indicates an intended position of the cursor and the friction value and step 615 illustrates rendering the webpage in the viewport such that the webpage scrolls in proportion to the value that indicates an amount of scroll of the webpage.

In an embodiment, processor readable instructions when executed by the at least one processor performs the steps of FIG. 5C. For example, step 620 represents receiving a value that indicates an intended position of a cursor in a viewable portion of a webpage.

Step 621 illustrates updating a cursor value used to display the cursor in the viewable portion of the webpage when a position of the cursor is in the margin. The updated cursor value indicates positioning the cursor at a distance that is farther away from an outer edge of the viewable portion than the intended position of the cursor.

Step 623 illustrates updating a scroll command to scroll the webpage when the position of the cursor is in the margin. The updated scroll command includes an amount of scroll that is proportional to a distance from an inner edge of the margin of the viewable portion to the position of the cursor in the margin.

Figure 6:
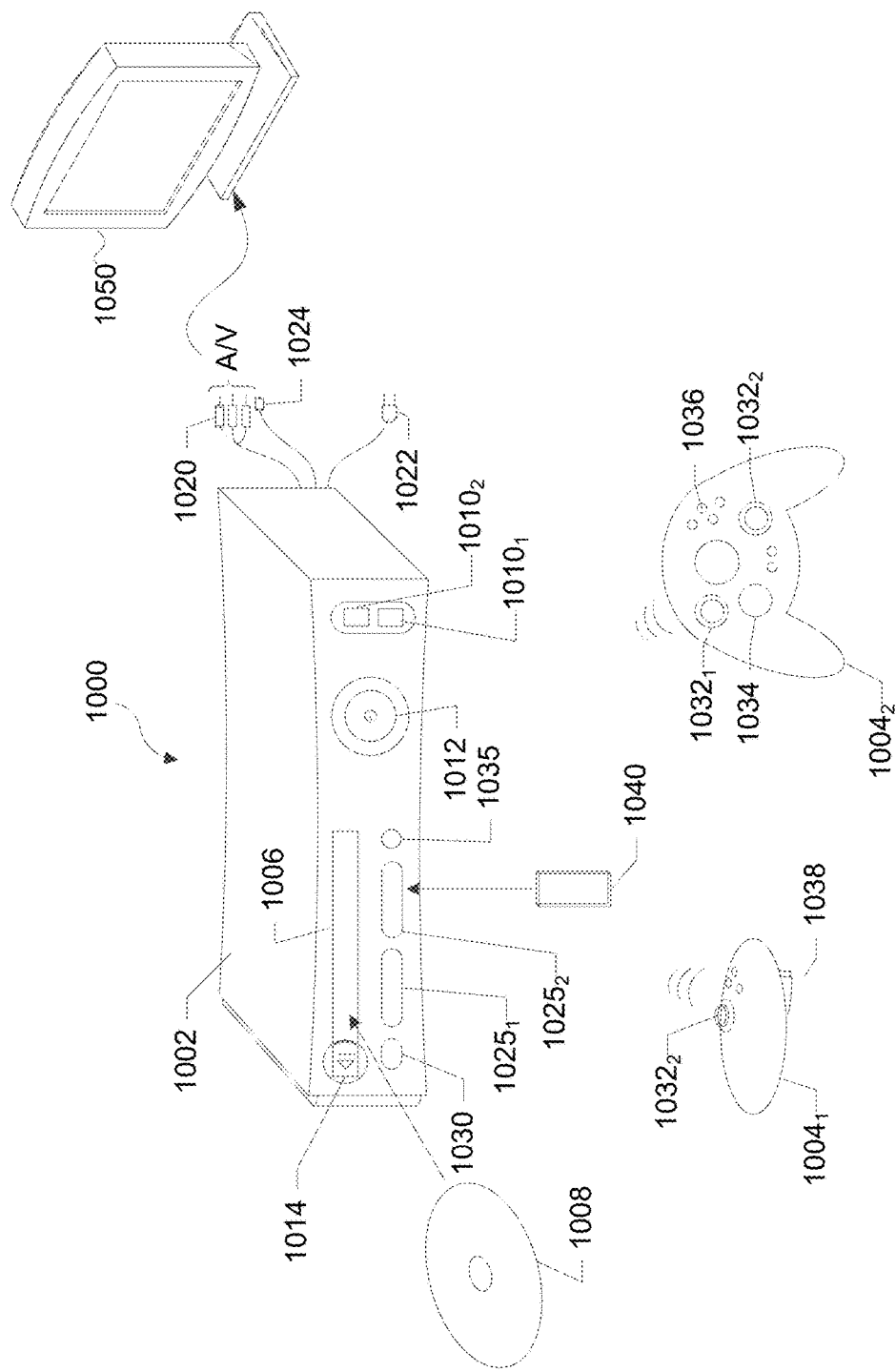
FIG. 6 is an isometric view of an exemplary gaming and media system.

In an embodiment, computing device 107 may be, but is not limited to, a video game and/or media console. FIG. 6 will now be used to describe an exemplary video game and media console, or more generally, will be used to describe an exemplary gaming and media system 1000 that includes a game and media console. The following discussion of FIG. 6 is intended to provide a brief, general description of a suitable computing device with which concepts presented herein may be implemented. It is understood that the system of FIG. 6 is by way of example only. In further examples, embodiments describe herein may be implemented using a variety of client computing devices, either via a browser application or a software application resident on and executed by a client computing device. As shown in FIG. 6, a gaming and media system 1000 includes a game and media console (hereinafter "console") 1002. In general, the console 1002 is one type of client computing device. The console 1002 is configured to accommodate one or more wireless controllers, as represented by controllers $1004_1$ and $1004_2$. The console 1002 is equipped with an internal hard disk drive and a portable media drive 1006 that support various forms of portable storage media, as represented by an optical storage disc 1008. Examples of suitable portable storage media include DVD, CD-ROM, game discs, and so forth. The console 1002 also includes two memory unit card receptacles $1025_1$ and $1025_2$, for receiving removable flash-type memory units 1040. A command button 1035 on the console 1002 enables and disables wireless peripheral support.

As depicted in FIG. 6, the console 1002 also includes an optical port 1030 for communicating wirelessly with one or more devices and two USB ports $1010_1$ and $1010_2$ to support a wired connection for additional controllers, or other peripherals. In some implementations, the number and arrangement of additional ports may be modified. A power button 1012 and an eject button 1014 are also positioned on the front face of the console 1002. The power button 1012 is selected to apply power to the game console, and can also provide access to other features and controls, and the eject button 1014 alternately opens and closes the tray of a portable media drive 1006 to enable insertion and extraction of an optical storage disc 1008.

The console 1002 connects to a television or other display (such as display 1050) via A/V interfacing cables 1020. In one implementation, the console 1002 is equipped with a dedicated A/V port configured for content-secured digital communication using A/V cables 1020 (e.g., A/V cables suitable for coupling to a High Definition Multimedia Interface "HDMI" port on a high definition display 1050 or other display device). A power cable 1022 provides power to the game console. The console 1002 may be further configured with broadband capabilities, as represented by a cable or modem connector 1024 to facilitate access to a network, such as the Internet. The broadband capabilities can also be provided wirelessly, through a broadband network such as a wireless fidelity (Wi-Fi) network.

Each controller 1004 is coupled to the console 1002 via a wired or wireless interface. In the illustrated implementation, the controllers 1004 are USB-compatible and are coupled to the console 1002 via a wireless or USB port 1010. The console 1002 may be equipped with any of a wide variety of user interaction mechanisms. In an example illustrated in FIG. 6, each controller 1004 is equipped with two thumb sticks $1032_1$ and $1032_2$, a D-pad 1034, buttons 1036, and two triggers 1038. A thumb stick $1032_1$ and/or $1032_2$ may pan or scroll a webpage shown on display 1050 by pressing on a thumb stick in the direction a user intends to pan a webpage. Each controller 1004 transmits a signal to console 1002 corresponding to the position of the thumb stick $1032_1$ and/or $1032_2$. When a user releases a force on thumb stick $1032_1$ and/or $1032_2$, the respective thumb sticks return to a zero or default position pointing directly up in an embodiment. In alternate embodiments, other types of controllers having sticks to position a cursor may be used, including analog devices that output a position value of the stick. These controllers are merely representative, and other known gaming controllers may be substituted for, or added to, those shown in FIG. 6.

In an embodiment, a user may enter input to console 1002 by way of gesture, touch or voice. In an embodiment, optical I/O interface 1135 receives and translates gestures of a user. In another embodiment, console 1002 includes a natural user interface (NUI) to receive and translate voice and gesture inputs from a user. In an alternate embodiment, front panel subassembly 1142 includes a touch surface and a microphone for receiving and translating a touch or voice, such as a voice command, of a user.

In one implementation, a memory unit (MU) 1040 may also be inserted into the controller 1004 to provide additional and portable storage. Portable MUs enable users to store game parameters for use when playing on other consoles. In this implementation, each controller is configured to accommodate two MUs 1040, although more or less than two MUs may also be employed.

The gaming and media system 1000 is generally configured for playing games (such as video games) stored on a memory medium, as well as for downloading and playing games, and reproducing pre-recorded music and videos, from both electronic and hard media sources. With the different storage offerings, titles can be played from the hard disk drive, from an optical storage disc (e.g., 1008), from an online source, or from MU 1040. Samples of the types of media that gaming and media system 1000 is capable of playing include:

Game titles played from CD and DVD discs, from the hard disk drive, or from an online streaming media source.

Digital music played from a CD in portable media drive 1006, from a file on the hard disk drive (e.g., music in a media format), or from online streaming media sources.

Digital audio/video played from a DVD disc in portable media drive 1006, from a file on the hard disk drive (e.g., Active Streaming Format), or from online streaming sources.

During operation, the console 1002 is configured to receive input from controllers 1004 and display information on the display 1050. For example, the console 1002 can display a user interface on the display 1050 to allow a user to select a game using the controller 1004 and display state solvability information as discussed below.

FIG. 7 is a functional block diagram of the gaming and media system 1000 and shows functional components of the gaming and media system 1000 in more detail. The console 1002 has a CPU 1100, and a memory controller 1102 that facilitates processor access to various types of memory, including a flash ROM 1104, a RAM 1106, a hard disk drive 1108, and the portable media drive 1006. In one implementation, the CPU 1100 includes a level 1 cache 1110 and a level 2 cache 1112, to temporarily store data and hence reduce the number of memory access cycles made to the hard drive 1108, thereby improving processing speed and throughput. In an embodiment, CPU 1100 and memory controller 1102 correspond to processor 103 and engine 105 while RAM 1106 corresponds to memory 102 in embodiments.

The CPU 1100, the memory controller 1102, and various memory devices are interconnected via one or more buses. The details of the bus that is used in this implementation are not particularly relevant to understanding the subject matter of interest being discussed herein. However, it will be understood that such a bus might include one or more of serial and parallel buses, a memory bus, a peripheral bus, and a processor or local bus, using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

In embodiments, signal paths as illustrated by arrows in FIGS. 8 and 9 are media that transfers a signal, such as an interconnect, conducting element, contact, pin, region in a semiconductor substrate, wire, metal trace/signal line, or photoelectric conductor, singly or in combination. A signal path may include a wireless connection or transfer. In an embodiment, multiple signal paths may replace a single signal path illustrated in the figures and a single signal path may replace multiple signal paths illustrated in the figures. In embodiments, a signal path may include a bus and/or point-to-point connection. In an embodiment, a signal path includes control and data signal lines to carry control and data information as well as timing information. In an alternate embodiment, a signal path includes data signal lines or control signal lines. In still other embodiments, signal paths are unidirectional (signals that travel in one direction) or bidirectional (signals that travel in two directions) or combinations of both unidirectional signal lines and bidirectional signal lines.

In one implementation, the CPU 1100, the memory controller 1102, the ROM 1104, and the RAM 1106 are integrated onto a common module 1114. In this implementation, the ROM 1104 is configured as a flash ROM that is connected to the memory controller 1102 via a PCI bus and a ROM bus (neither of which are shown). The RAM 1106 is configured as multiple Double Data Rate Synchronous Dynamic RAM (DDR SDRAM) modules that are independently controlled by the memory controller 1102 via separate buses. The hard disk drive 1108 and the portable media drive 1006 are shown connected to the memory controller 1102 via the PCI bus and an AT Attachment (ATA) bus 1116. However, in other implementations, dedicated data bus structures of different types can also be applied in the alternative.

In an embodiment, RAM 1106 may represent one or more processor readable memories. In an embodiment, RAM 1106 may be a Wide I/O DRAM. Alternatively, memory 402 may be Low Power Double Data Rate 3 dynamic random access memory (LPDDR3 DRAM) memory (also known as Low Power DDR, mobile DDR (MDDR) or mDDR). In an embodiment, memory 402 may be a combination of different types of memory.

In embodiments, RAM 1106 includes one or more arrays of memory cells in an IC disposed on a semiconductor substrate. In an embodiment, RAM 1106 is included in an integrated monolithic circuit housed in a separately packaged device than CPU 1100.

RAM 1106 may be replaced with other types of volatile memory that include at least dynamic random access memory (DRAM), molecular charge-based (ZettaCore) DRAM, floating-body DRAM and static random access memory ("SRAM"). Particular types of DRAM include double data rate SDRAM ("DDR"), or later generation SDRAM (e.g., "DDRn").

ROM 1104 may likewise be replaced with other types of non-volatile memory including at least types of electrically erasable program read-only memory ("EEPROM"), FLASH (including NAND and NOR FLASH), ONO FLASH, magneto resistive or magnetic RAM ("MRAM"), ferroelectric RAM ("FRAM"), holographic media, Ovonic/phase change, Nano crystals, Nanotube RAM (NRAM-Nantero), MEMS scanning probe systems, MEMS cantilever switch, polymer, molecular, nano-floating gate and single electron.

A three-dimensional graphics processing unit 1120 and a video encoder 1122 form a video processing pipeline for high speed and high resolution (e.g., High Definition) graphics processing. Data are carried from the graphics processing unit 1120 to the video encoder 1122 via a digital video bus. An audio processing unit 1124 and an audio codec (coder/decoder) 1126 form a corresponding audio processing pipeline for multi-channel audio processing of various digital audio formats. Audio data are carried between the audio processing unit 1124 and the audio codec 1126 via a communication link. The video and audio processing pipelines output data to an A/V (audio/video) port 1128 for transmission to a television or other display. In the illustrated implementation, the video and audio processing components 1120-1128 are mounted on the module 1114.

In an embodiment, the CPU 1100, the memory controller 1102, the ROM 1104, RAM 1106 and graphics processing unit 1120 are included in a SoC, such as SoC 401 illustrated in FIG. 6.

FIG. 7 shows the module 1114 including a USB host controller 1130 and a network interface 1132. The USB host controller 1130 is shown in communication with the CPU 1100 and the memory controller 1102 via a bus (e.g., PCI bus) and serves as host for the peripheral controllers $1004_1$-$1004_4$. The network interface 1132 provides access to a network (e.g., Internet, home network, etc.) and may be any of a wide variety of various wire or wireless interface components including an Ethernet card, a modem, a wireless access card, a Bluetooth module, a cable modem, and the like.

In the implementation depicted in FIG. 7, the console 1002 includes a controller support subassembly 1140 for supporting the four controllers 1004$_1$-1004$_4$. The controller support subassembly 1140 includes any hardware and software components to support wired and wireless operation with an external control device, such as for example, a media and game controller. A front panel I/O subassembly 1142 supports the multiple functionalities of power button 1012, the eject button 1014, as well as any LEDs (light emitting diodes) or other indicators exposed on the outer surface of console 1002. Subassemblies 1140 and 1142 are in communication with the module 1114 via one or more cable assemblies 1144. In other implementations, the console 1002 can include additional controller subassemblies. The illustrated implementation also shows an optical I/O interface 1135 that is configured to send and receive signals that can be communicated to the module 1114.

The MUs 1040$_1$ and 1040$_2$ are illustrated as being connectable to MU ports "A" 1030$_1$ and "B" 1030$_2$ respectively. Additional MUs (e.g., MUs 1040$_3$-1040$_6$) are illustrated as being connectable to the controllers 1004$_1$ and 1004$_3$, i.e., two MUs for each controller. The controllers 1004$_2$ and 1004$_4$ can also be configured to receive MUs. Each MU 1040 offers additional storage on which games, game parameters, and other data may be stored. In some implementations, the other data can include any of a digital game component, an executable gaming application, an instruction set for expanding a gaming application, and a media file. When inserted into the console 1002 or a controller, the memory controller 1102 can access the MU 1040.

A system power supply module 1150 provides power to the components of the gaming system 1000. A fan 1152 cools the circuitry within the console 1002.

An application 1160 comprising processor readable instructions is stored on the hard disk drive 1108. When the console 1002 is powered on, various portions of the application 1160 are loaded into RAM 1106, and/or caches 1110 and 1112, for execution on the CPU 1100, wherein the application 1160 is one such example. Various applications can be stored on the hard disk drive 1108 for execution on CPU 1100.

The console 1002 is also shown as including a communication subsystem 1170 configured to communicatively couple the console 1002 with one or more other computing devices (e.g., other consoles). The communication subsystem 1170 may include wired and/or wireless communication devices compatible with one or more different communication protocols. As non-limiting examples, the communication subsystem 1170 may be configured for communication via a wireless telephone network, or a wired or wireless local- or wide-area network. In some embodiments, the communication subsystem 1170 may allow the console 1002 to send and/or receive messages to and/or from other devices via a network such as the Internet. In specific embodiments, the communication subsystem 1170 can be used to communicate with a coordinator and/or other computing devices, for sending download requests, and for effecting downloading and uploading of digital content. More generally, the communication subsystem 1170 can enable the console 1002 to participate on peer-to-peer communications.

The gaming and media system 1000 may be operated as a standalone system by simply connecting the system to a display 1050 (FIG. 6), a television, a video projector, or other display device. In this standalone mode, the gaming and media system 1000 enables one or more players to play games, or enjoy digital media, e.g., by watching movies, or listening to music. However, with the integration of broadband connectivity made available through network interface 1132, or more generally the communication subsystem 1170, the gaming and media system 1000 may further be operated as a participant in a larger network gaming community, such as a peer-to-peer network.

The above described console 1002 is just one example of the computing device 107 discussed above with reference to FIG. 1 and various other Figures. As was explained above, there are various other types of computing devices with which embodiments described herein can be used.

FIG. 8 is a block diagram of one embodiment of a computing device 107 which may host at least some of the software components illustrated in FIGS. 1 and 3-5A-B. In its most basic configuration, computing device 1800 typically includes one or more processing units 1802 including one or more CPUs and one or more GPUs. Computing device 1800 also includes system memory 1804. Depending on the exact configuration and type of computing device, system memory 1804 may include volatile memory 1805 (such as RAM), non-volatile memory 1807 (such as ROM, flash memory, etc.) or some combination of the two. This most basic configuration is illustrated in FIG. 8 by dashed line 1806. Additionally, device 1800 may also have additional features/functionality. For example, device 1800 may also include additional storage (removable and/or non-removable) including, but not limited to, magnetic or optical discs or tape. Such additional storage is illustrated in FIG. 8 by removable storage 1808 and non-removable storage 1810.

Device 1800 may also contain communications connection(s) 1812 such as one or more network interfaces and transceivers that allow the device to communicate with other devices. Device 1800 may also have input device(s) 1814 such as keyboard, mouse, pen, voice input device, touch input device, gesture input device, etc. Output device(s) 1816 such as a display, speakers, printer, etc. may also be included. These devices are well known in the art so they are not discussed at length here.

The foregoing detailed description of the inventive system has been presented for purposes of illustration and description. It is not intended to be exhaustive or to limit the inventive system to the precise form disclosed. Many modifications and variations are possible in light of the above teaching. The described embodiments were chosen in order to best explain the principles of the inventive system and its practical application to thereby enable others skilled in the art to best utilize the inventive system in various embodiments and with various modifications as are suited to the particular use contemplated. It is intended that the scope of the inventive system be defined by the claims appended hereto.

What is claimed is:

1. A method to view a webpage, the method comprising:
    determining a position of a cursor maneuvered by continually displacing the cursor according to a first displacement vector received from a physically actuated cursor positioning device;
    calculating a friction value to be applied to the cursor equal to zero, corresponding to the position of the cursor when the cursor is in a viewable portion of the webpage in a graphical window on a display and outside a margin of the viewable portion of the webpage, the margin being an area adjacent boundaries of the graphical window calculating a non-zero friction value to be applied to the cursor, corresponding to the position of the cursor when the cursor is in the margin of the viewable portion of the webpage, and increasing as the cursor moves further into the margin of the viewable portion of the webpage toward one or more of the boundaries of the graphical window;

calculating a scroll value that indicates an amount of scroll to provide the webpage, the scroll value increasing as the cursor moves further into the margin of the viewable portion of the webpage toward one or more of the boundaries of the graphical window;

calculating a direction of scroll that indicates a direction of scroll in a direction opposite the direction of the first displacement vector;

calculating a second displacement vector, the second displacement vector defining a displacement of the cursor in the direction of scroll, with an amount of displacement equal to the scroll value multiplied by the friction value;

calculating a summed displacement vector as a summation of the first displacement vector and the second displacement vector;

updating the position of the cursor by applying the summed displacement vector to a current position of the cursor;

displaying the webpage scrolled based on the scroll value and the direction of scroll; and displaying the cursor at the updated cursor position.

2. The method of claim 1, further comprising receiving a signal that indicates a requested position of the cursor in the viewable portion of the webpage.

3. The method of claim 2, wherein the signal that indicates the requested position of the cursor in the viewable portion of the webpage corresponds to a position of a stick in a controller.

4. The method of claim 3, wherein the cursor is positioned in the margin of the viewable portion of the webpage, and wherein the cursor is displaced away from one or more of the boundaries of the graphical window and out of the margin when the stick returns to a default position.

5. The method of claim 1, wherein the method is performed by a browser having processor readable instructions.

6. The method of claim 5, wherein the browser having processor readable instructions is executed by a processor in a console that provides at least a video game.

7. The method of claim 6, wherein calculating the friction value and calculating the scroll value occur when a frame of the video game is updated by the console.

8. The method of claim 1, wherein the viewable portion of the webpage is a viewport.

9. An apparatus comprising;
a user controlled cursor positioning device;
at least one processor readable memory;
a browser, stored in the one or more processor readable memory, having processor readable instructions to position a webpage in a graphical window on a display; and
at least one processor that executes the processor readable instructions of the browser to:
receive a first displacement vector from the user controlled cursor positioning device;
determine a position of the cursor maneuvered by continually displacing the cursor according to the first displacement vector;
calculate a friction value to be applied to the cursor equal to zero, corresponding to the position of the cursor when the cursor is in a viewable portion of the webpage in the graphical window, and outside a margin of the viewable portion of the webpage, the margin being an area adjacent boundaries of the graphical window;
calculate a non-zero friction value to be applied to the cursor, corresponding to the position of the cursor when the cursor is in the margin of the viewable portion of the web page, and increasing as the cursor moves further into the margin of the viewable portion of the webpage toward one or more of the boundaries of the graphical window;
calculate a scroll value that indicates an amount of scroll to provide the webpage, the scroll value increasing as the cursor moves further into the margin of the viewable portion of the webpage toward one or more of the boundaries of the graphical window;
calculate a direction of scroll that indicates a direction of scroll in a direction opposite the direction of the first displacement vector;
calculate a second displacement vector, the second displacement vector defining a displacement of the cursor in the direction of scroll, with an amount of displacement equal to the scroll value multiplied by the friction value;
calculate a summed displacement vector as a summation of the first displacement vector and the second displacement vector;
update the position of the cursor by applying the summed displacement vector to a current position of the cursor;
display the webpage scrolled based on the scroll value and the direction of scroll; and
display the cursor at the updated cursor position.

10. The apparatus of claim 9, wherein the apparatus includes a console to provide a video game; and wherein the position of the cursor and the scroll value are updated in a frame of the video game.

11. The apparatus of claim 10, wherein the user controlled cursor positioning device includes a stick that provides the first displacement vector when the stick is positioned a predetermined distance from a default position.

12. The apparatus of claim 11, wherein calculating the non-zero friction value includes calculating a first non-zero friction value when the cursor is in one of a vertical margin of the viewable portion of the webpage and a horizontal margin of the viewable portion of the webpage.

13. The apparatus of claim 12, wherein calculating the non-zero friction value includes calculating a second non-zero friction value when the cursor is in a diagonal margin portion of the viewable portion of the webpage.

14. The apparatus of claim 13, wherein the first and second non-zero friction values are normalized over a first and second predetermined number of pixels.

* * * * *